US012472762B1

(12) United States Patent
Gilson et al.

(10) Patent No.: US 12,472,762 B1
(45) Date of Patent: Nov. 18, 2025

(54) SUBLIMATION OF A MULTI-LAYER ITEM

(71) Applicant: Gilson Snow, Inc., Selinsgrove, PA (US)

(72) Inventors: Nicholas James Gilson, Lewisburg, PA (US); Austin Robert Royer, New Berlin, PA (US)

( * ) Notice: Subject to any disclaimer, the term of this patent is extended or adjusted under 35 U.S.C. 154(b) by 0 days.

(21) Appl. No.: 19/210,385

(22) Filed: May 16, 2025

Related U.S. Application Data

(63) Continuation of application No. 19/186,134, filed on Apr. 22, 2025.

(60) Provisional application No. 63/785,842, filed on Apr. 9, 2025.

(51) Int. Cl.
*B41M 5/035* (2006.01)
*B41M 3/00* (2006.01)

(52) U.S. Cl.
CPC .......... *B41M 5/0358* (2013.01); *B41M 3/008* (2013.01); *B41M 2205/06* (2013.01); *B41M 2205/10* (2013.01)

(58) Field of Classification Search
CPC ................ B41M 5/0358; B41M 3/008; B41M 2205/06; B41M 2205/10
See application file for complete search history.

(56) References Cited

U.S. PATENT DOCUMENTS

| | | | | |
|---|---|---|---|---|
| 4,391,663 A * | 7/1983 | Hutter, III | G05D 23/1909 | 392/407 |
| 2012/0193765 A1* | 8/2012 | Kelekar | H05B 6/105 | 257/629 |
| 2023/0128103 A1* | 4/2023 | Humenick | B41F 16/0006 | 101/450.1 |

FOREIGN PATENT DOCUMENTS

WO WO-2014114450 A2 * 7/2014 ................ C08J 5/10

* cited by examiner

*Primary Examiner* — Yaovi M Ameh
(74) *Attorney, Agent, or Firm* — Sunstein LLP

(57) ABSTRACT

A sublimation device, for transferring ink from a sheet to a multi-layered workpiece, includes: a first membrane; a vacuum device to produce a vacuum to draw the first membrane against the sheet to draw the sheet against the multi-layered workpiece; a heating mechanism comprising at least one energy source to heat the ink and at least a first surface of the multi-layered workpiece to at least a sublimation temperature of the ink while the sheet is drawn against at least the first surface of the multi-layered workpiece and the first membrane is drawn against the sheet; a sensor mechanism capable of sensing at least one sensed temperature indicative of at least one surface temperature of the first surface of the multi-layered workpiece; and a controller, communicatively coupled to the heating mechanism and the sensor mechanism, to control the heating mechanism based on the at least one sensed temperature.

13 Claims, 9 Drawing Sheets

SUBLIMATION OF A MULTI-LAYER ITEM

CROSS-REFERENCE TO RELATED APPLICATIONS

This application is a continuation of U.S. patent application Ser. No. 19/186,134, filed Apr. 22, 2025, entitled "SUBLIMATION OF A MULTI-LAYER ITEM," which claims the benefit of U.S. Provisional Application No. 63/785,842, filed Apr. 9, 2025, entitled "SUBLIMATION OF A MULTI-LAYER ITEM," the entire contents of both of which are hereby incorporated herein by reference for all purposes.

BACKGROUND

Various apparatus are made in multiple layers of materials. For example, snowboards, skis, wakeboards, wakesurfers, surboards, skimboards, etc. may comprise multiple layers of materials, e.g., plastic, wood, and fiberglass. Adhesive may be used to hold the layers of materials together.

It is often desired to have a graphic or artwork on a multi-layered item. For example, a consumer may want to have a visual design on a snowboard, ski, wakeboard, wakesurfer, surfboard or skimboard that appeals to the consumer. The design may appeal to the consumer for any of a variety of reasons, e.g., showing allegiance to a sports team or school, showing a style of the consumer, etc.

Visual designs may be provided to (e.g., applied to or built into) an item in a variety of ways. For example, a design may be painted on a surfboard foam blank, or may be silk screen printed onto an item, or may be created through die cutting pieces of different-color materials and arranging the pieces together to create an image, or may be transferred from one item to another by sublimation, or by other means. To use sublimation to apply a design to a product, the design may be printed with ink onto a sheet of material, the sheet of material placed against the product, and the ink heated above a sublimation temperature of the ink. The ink will change from a solid to a gas, and the ink molecules will penetrate the product, transferring the design from the sheet to the product.

Artwork for a snowboard or ski, for example, may be transferred using sublimation to a flat plastic sheet that will be used for a top surface or a bottom surface of the snowboard or ski. The snowboard or ski may be made by adhering multiple flat layers of materials together, with the top and bottom materials including the artwork being an outer layer of the snowboard or ski. The layers of materials may then be shaped as desired into a non-flat snowboard or ski.

SUMMARY

An example sublimation device, for transferring ink from a sheet to a multi-layered workpiece, includes: a first membrane; a vacuum device to produce a vacuum to draw the first membrane against the sheet to draw the sheet against the multi-layered workpiece; a heating mechanism comprising at least one energy source to heat the ink and at least a first surface of the multi-layered workpiece to at least a sublimation temperature of the ink while the sheet is drawn against at least the first surface of the multi-layered workpiece and the first membrane is drawn against the sheet; a sensor mechanism capable of sensing at least one sensed temperature indicative of at least one surface temperature of the first surface of the multi-layered workpiece; and a controller, communicatively coupled to the heating mechanism and the sensor mechanism, to control the heating mechanism based on the at least one sensed temperature.

An example method, for transferring ink from a sheet to a multi-layered workpiece, includes: contacting a first surface of a multi-layered workpiece with the sheet containing ink; heating, using at least one energy source, the ink and the first surface of the multi-layered workpiece to at least a sublimation temperature of the ink while the sheet is in contact with the first surface of the multi-layered workpiece; sensing at least one sensed temperature indicative of at least one surface temperature of the first surface of the multi-layered workpiece; and controlling the at least one energy source based on the at least one sensed temperature.

DETAILED DESCRIPTION

Figure 1:
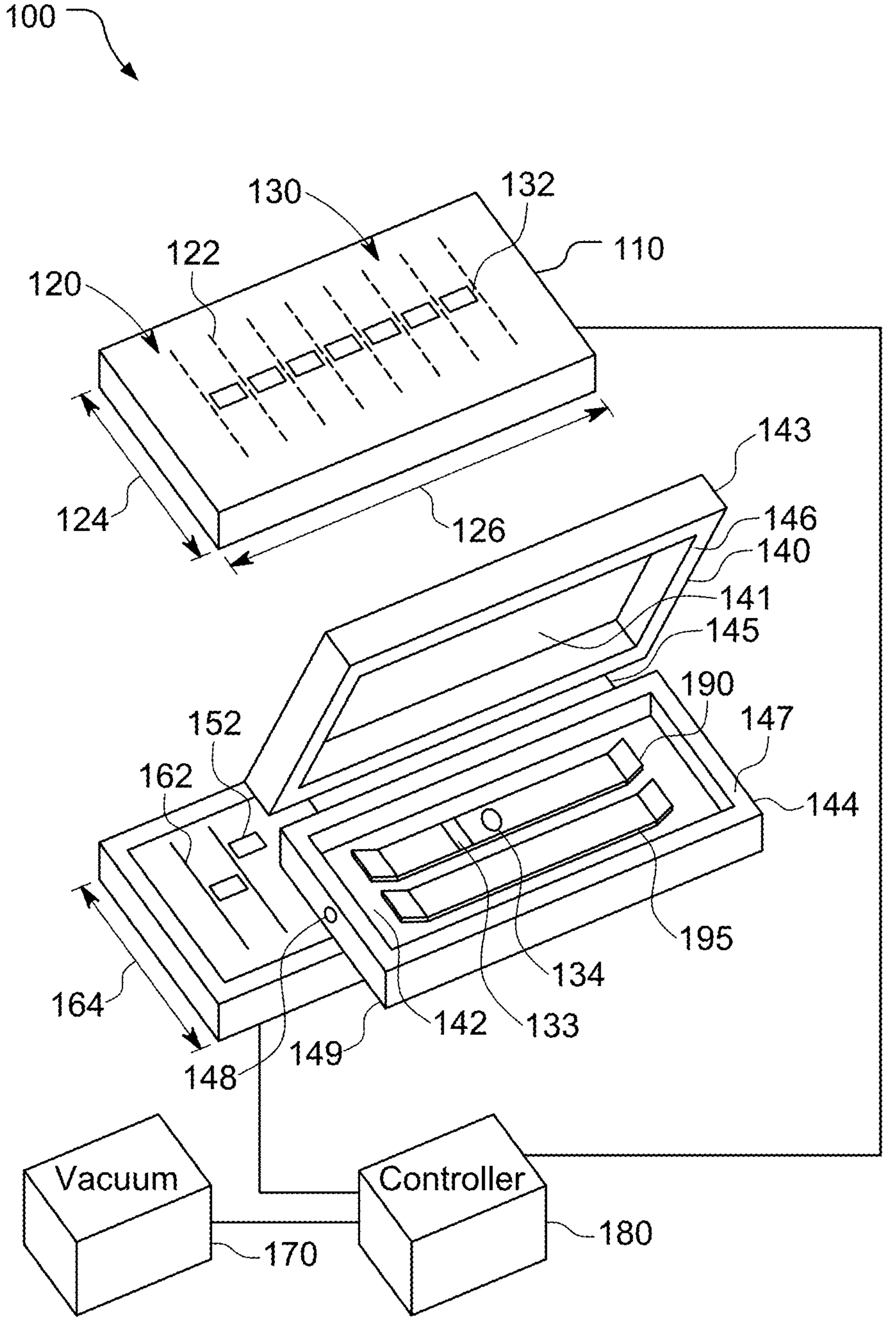
FIG. 1 is a perspective view of a sublimation device in an open state with two workpieces disposed in the sublimation device.

Techniques are discussed herein for transferring ink to a multi-layered workpiece by sublimation. For example, a workpiece may be a snowboard (although other forms of workpieces may be used, e.g., a ski, a wakeboard, etc.) and may comprise multiple layers of different materials held together by adhesive (e.g., epoxy). Ink may be printed on a sheet and the sheet put in contact with an outer layer of the snowboard, e.g., by pulling a vacuum between the snowboard and a flexible membrane, with the sheet disposed between the snowboard and the flexible membrane. The ink and the surface of the snowboard adjacent to the sheet may be heated, e.g., by a set of energy sources such as lights (e.g., infrared lights or lasers) to at least a sublimation temperature of the ink. The ink and the surface may be flash heated or more slowly heated. The temperature of the surface of the snowboard may be monitored by multiple temperature sensors (e.g., pyrometers). The energy sources may be controlled to keep the temperature of the surface of the snowboard substantially uniform, and to keep a temperature of adhesive (e.g., between the outer layer and another layer) below a breakdown temperature of the adhesive at which the adhesive changes from being rigid to being ductile. For an epoxy adhesive, the breakdown temperature is a glass transition temperature. Ink may be transferred to different portions of the workpiece, e.g., a top outer layer and a bottom outer layer, for different amounts of time and/or at different temperatures (e.g., due to different thicknesses of the different portions, and/or different inks (e.g., with different sublimation temperatures) being applied to the different portions, and/or different desired depths of ink penetration, etc.). These are examples, and other examples may be implemented.

Items and/or techniques described herein may provide one or more of the following capabilities, as well as other capabilities not mentioned. Ink, e.g., artwork, may be transferred to a multi-layered workpiece by sublimation late in a production cycle of the workpiece. Ink may be transferred by sublimation to a multi-layered workpiece held together by adhesive without causing the adhesive to break a bond between layers of the workpiece. A workpiece surface, e.g., a curved surface of a three-dimensional workpiece, may be heated substantially uniformly which may result in substantially uniform ink penetration by sublimation into a workpiece. Overstock waste may be reduced or even eliminated, e.g., by producing products with artwork only in response to purchase requests for the products with the artwork, or producing products with artwork beyond a threshold quantity of the products only in response to purchase requests for the products with the artwork. Inventory risk may thus be reduced or eliminated. A/B testing may be enabled on a product level, with the ability to scale better-performing (e.g., better-selling) products dynamically. Delivery time for a custom-order product may be reduced, e.g., from weeks or months to days. Large spikes in product demand may be satisfied without producing backorders (or at least without producing a significant backorder quantity). A blended cost of customer acquisition may be reduced by scaling trending products, e.g., beyond manufacturing capacity, without having to manage backorder volume. Personalized, tailored products may be provided to customers quickly, which may enhance consumer experience, and drive a consumer-product connection and loyalty. Payment may be collected for a product sale when only the cost of blank production has been incurred and before final production costs for the product are incurred. Low-risk, large-scale collaborations, e.g., with notable brands and/or persons, may be enabled by removing the need for fully finished inventory that already has the artwork on the product, allowing the blank products to be evergreen from an artwork standpoint. Consumer acquisition cost may be reduced, e.g., via audience sharing and interest-aligned endorsements. Product waste and associated carbon footprint may be reduced. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Figure 2:
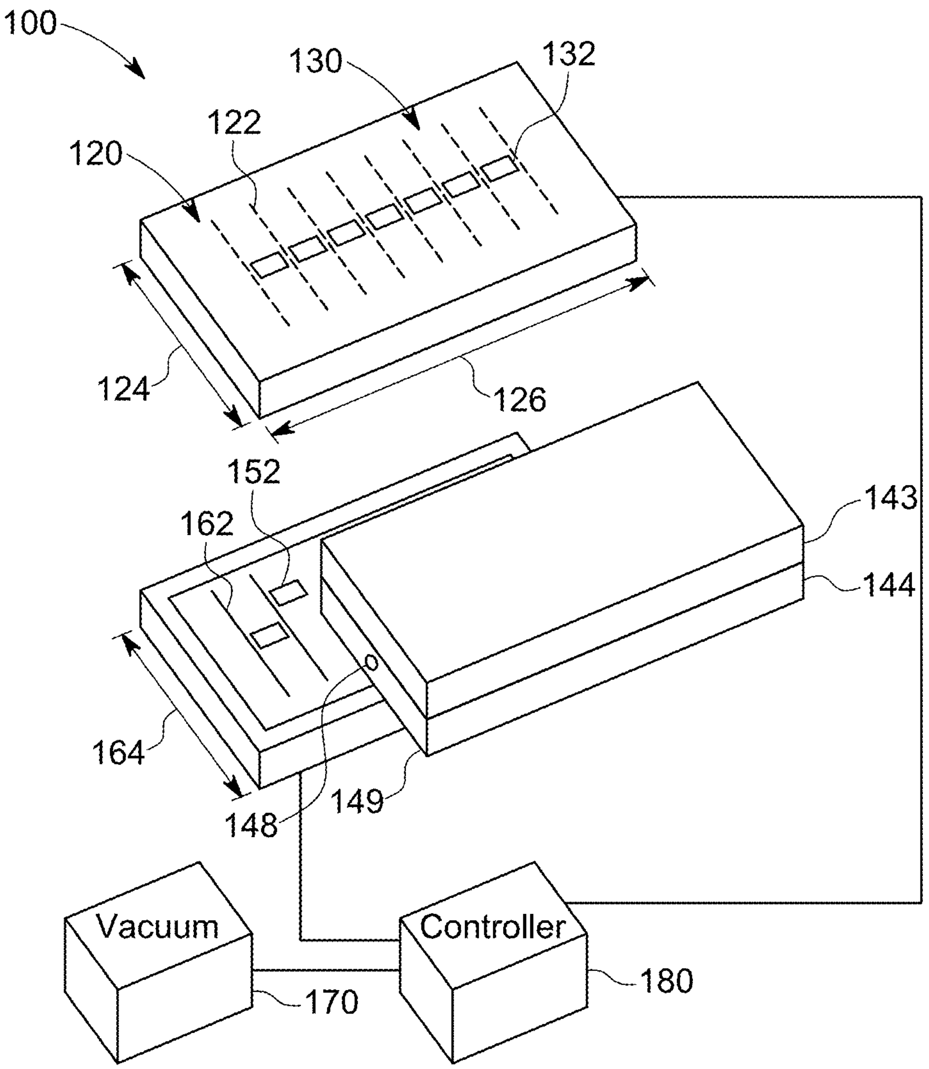
FIG. 2 is a perspective view of the sublimation device shown in FIG. 1 with the sublimation device in a closed state.

Referring to FIG. 1 and FIG. 2, a sublimation device 100 includes a frame 110, an upper heating mechanism 120, an upper sensor mechanism 130, a workpiece container 140, a lower sensor mechanism 150, a lower heating mechanism 160, a vacuum 170, and a controller 180. The sublimation device 100 is configured to transfer ink by sublimation to workpieces 190, 195 contained in the workpiece container 140. In this example, the device 100 may transfer ink by sublimation to opposite sides of the workpieces 190, 195 without having to flip the workpieces 190, 195. The device 100 may concurrently transfer ink by sublimation to opposite sides of the workpieces 190, 195. Other configurations of sublimation devices may be used. For example, as discussed further below, a sublimation device may be configured to transfer ink to one side of a workpiece, e.g., including a single heating mechanism, a single sensor mechanism, and a workpiece container with a membrane for a single side of the workpiece. The membrane may comprise rubber and/or another material and may be opaque (e.g., white) or transparent. As another example, the container 140 may be configured to hold multiple workpieces, e.g., multiple snowboards. Still other configurations may be used. The sublimation device 100 is configured to transfer ink by sublimation into opposite sides of the workpieces 190, 195, but other sublimation device configurations may be used, e.g., for transferring ink into a single side of each of the workpieces 190, 195. The sublimation device 100 is configured to accommodate two, non-flat workpieces (e.g., snowboards, skis, wakeboards, etc.) for ink transfer by sublimation, but other configurations may be used, e.g., for transferring ink to other workpieces and/or for transferring ink to a single workpiece at a time (or for transferring ink to more than two workpieces at a time).

The workpiece container 140 in this example has a clamshell configuration, including an upper membrane 141, a lower membrane 142, an upper container member 143, a lower container member 144, and a hinge 145. The clamshell configuration is an example, and other configurations (e.g., as discussed further below) may be used. The hinge 145 is configured to allow the members 143, 144 to pivot relative to each other between an open state (as shown in FIG. 1) and a closed state, with the members 143, 144 disposed against each other (e.g., as shown in FIG. 2). In the closed state, an airtight seal is provided between the members 143, 144 The workpiece container 140 is slidably coupled to the frame 110. For example, the workpiece container 140 may be pulled away from the frame 110 and opened to receive the workpiece 190. The upper membrane 141 is attached to a bottom 146 of the upper container member 143 and the lower membrane 142 is attached to the lower container member 144 below a top 147 of the lower container member 144 to receive the workpiece 190. With the workpiece 190 received by the workpiece container 140, the workpiece container 140 may be closed and slid back within the frame 110.

Figure 3:
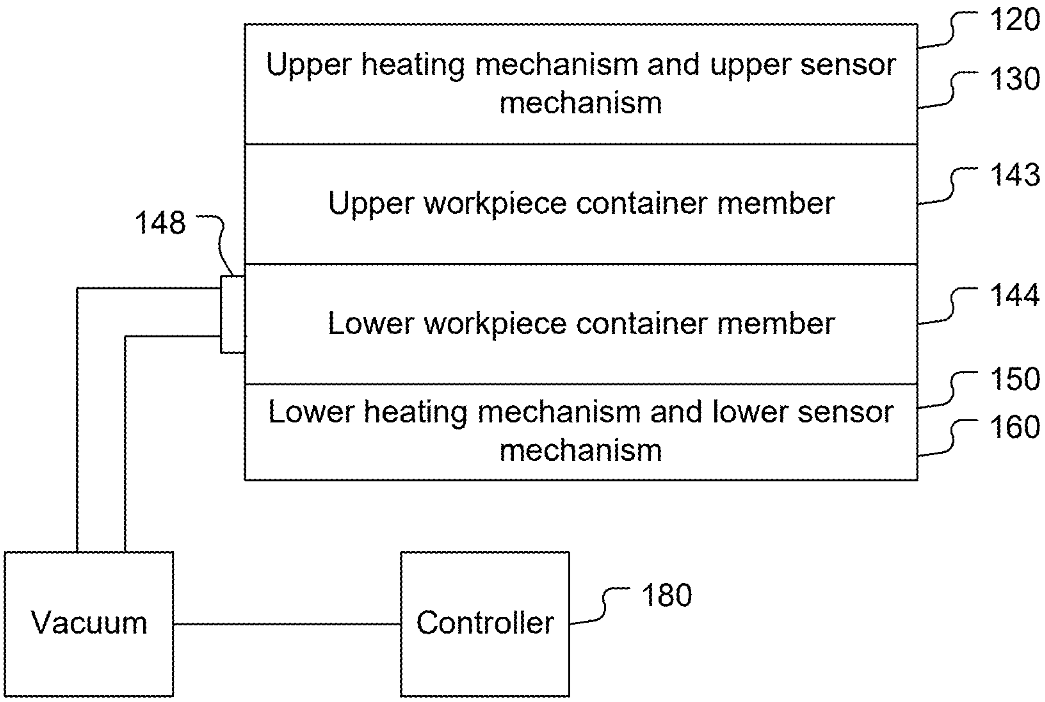
FIG. 3 is a block diagram of the sublimation device shown in FIG. 2.
Figure 4:
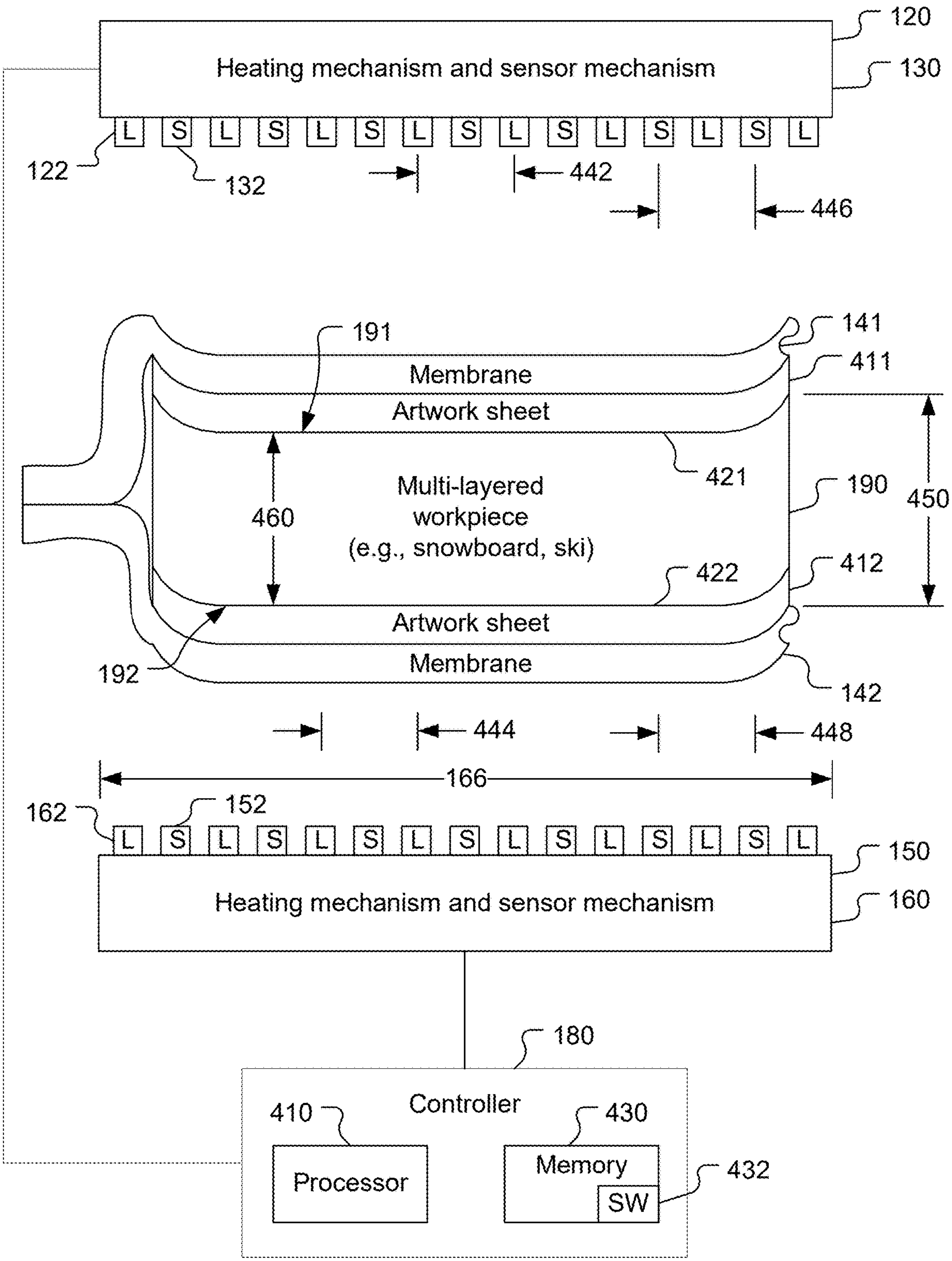
FIG. 4 is a simplified cut-away front view of the sublimation device shown in FIG. 2.

Referring also to FIG. 3 and FIG. 4, the workpiece container 140 (see FIG. 1) is configured to hold sheets containing ink against the workpiece 190. The workpiece 190 is a three-dimensional, non-flat workpiece in that the workpiece 190 has a height 450 that is greater than a thickness 460 of the workpiece 190, the workpiece 190 have been shaped (e.g., bent) to a desired configuration. In the example shown in FIG. 3, the workpiece container 140 is closed (with the members 143, 144 disposed against each other), the upper heating mechanism 120 and the upper sensor mechanism 130 are disposed abutting the upper workpiece container member 143, and the lower heating mechanism 160 and the lower sensor mechanism 150 are disposed abutting the lower workpiece container member 144. This is an example, and other configurations may be used, e.g., with the mechanisms 120, 130 displaced from the upper workpiece container member 143 and/or the mechanisms 150, 160 displaced from the lower workpiece container member 144. The lower workpiece container member 144 includes a connector 148 configured to connect to the vacuum 170. The connector 148 provides a port in fluid communication with a passage through a sidewall 149 (FIG. 1) of the lower container member 144 such that the port is in fluid communication with a volume defined by the lower container member 144 (above the membrane 142 and between sidewalls of the member 144). The membranes 141, 142 are made of flexible material configured to adapt (e.g., conform) to respective surfaces of the workpiece 190 in response to the vacuum 170 pulling a vacuum between the membranes 141, 142 with the workpiece container 140 in the closed (shut) state. For example, the membranes 141, 142 may comprise silicon and may be any of a variety of colors, or may be transparent. In the example shown in FIG. 4, an artwork sheet 411 has ink printed on a bottom side 421 of the sheet 411 and an artwork sheet 412 has ink printed on a top side 422 of the sheet 412. With a vacuum pulled between the membranes 141, 142, the membranes 141, 142 are pushed against the artwork sheets 411, 412 and the artwork sheets 411, 412 are pushed by the membranes 141, 142 against the workpiece 190. In this example, the artwork sheet 411 is pushed against a top of the workpiece 190 and the artwork sheet 412 is pushed against a bottom of the workpiece 190. The membranes 141, 142 extend beyond the workpiece 190, but for sake of simplicity of the figure, are shown as being co-terminus with the workpiece 190. The artwork sheets 411, 412 may extend beyond the workpiece 190, but for sake of simplicity of the figure, are shown as being co-terminus with the workpiece 190.

The controller 180 includes a processor 410 and memory 430, and is communicatively coupled to the vacuum 170, the upper heating mechanism 120, the lower heating mechanism 160, the upper sensor mechanism 130, and the lower sensor mechanism 150. Even if referred to in the singular, the processor 410 may include one or more processors, and the memory 430 may include one or more memories. The processor 410 may include one or more hardware devices, e.g., a central processing unit (CPU), a microcontroller, an application specific integrated circuit (ASIC), etc. The processor 410 may comprise multiple processors including a general-purpose/application processor, a Digital Signal Processor (DSP), and/or a sensor processor, and/or one or more other processors, with one or more of these processors possibly comprising multiple devices (e.g., multiple processors). The memory 430 may be a non-transitory, processor-readable storage medium that may include random access memory (RAM), flash memory, disc memory, and/or read-only memory (ROM), etc. The memory 430 may store software 432 which may be processor-readable, processor-executable software code containing instructions that may be configured to, when executed, cause the processor 410 to perform various functions described herein. Alternatively, the software 432 may not be directly executable by the processor 410 but may be configured to cause the processor 410, e.g., when compiled and executed, to perform the functions. The processor 410 may include a memory with stored instructions in addition to and/or instead of the memory 430. The description herein may refer to the processor 410 performing a function, but this includes other implementations such as where the processor 410 executes instructions of software and/or firmware. The description herein may refer to the controller 180, or even the device 100 performing a function as shorthand for one or more appropriate components of the controller 180 or the device 100 performing the function.

The upper heating mechanism 120 and the lower heating mechanism 160 may be configured to heat respective surfaces of the workpiece 190 to substantially uniform temperatures. For example, the upper heating mechanism 120 and the lower heating mechanism 160 may be configured to heat a top surface 191 and a bottom surface 192 of the workpiece 190 such that a variation in temperature over each of the surfaces 191, 192 is less than 10% (e.g., less than 8%, less than 5%, less than 3%) with the surfaces 191, 192 at or above a sublimation temperature of ink in the sheets 411, 412. The upper heating mechanism 120 includes multiple energy sources 122 and the lower heating mechanism 160 includes multiple energy sources 162 for heating surfaces 191, 192, respectively. In this example, the energy sources 122, 162 are lights such as infrared lights. The discussion herein focuses on light sources as the energy sources 122, 162, but other types of energy sources may be used. Light sources may be able to more precisely control (compared to other types of energy sources) which areas of the surfaces 191, 192 are heated. Each of the energy sources 122, 162 is configured to provide light over a width of the workpiece 190. Each of the energy sources 122, 162 energy sources 122, 162 may extend over a majority (e.g., over 50%, over 70%, over 90%) of a width 124, 164 of the mechanisms 120, 160, respectively. The energy sources 122, 162 may be disposed over a majority (e.g., over 50%, over 70%, over 90%) of a length 126, 166 (see FIG. 4) of the mechanisms 120, 160, respectively. Quantities and center-to-center spacings 442, 444 of the energy sources 122, 162 may be selected to help ensure that the heating mechanisms 120, 160 can heat the surfaces 191, 192 to substantially uniform temperatures. The quantities and configurations (e.g., shapes) of the energy sources 122, 162 shown are examples and other quantities and/or configurations of energy sources may be used.

The energy sources 122, 162 in combination with the controller 180 may be configured to apply energy directionally to either or both of the surfaces 191, 192, e.g., to adjust phases of light provided by the energy sources 122 and/or the energy sources 162 to direct light to one or more desired regions of the top surface 191 and/or the bottom surface 192, respectively. The controller 180 may be configured to cause different ones of the energy sources 122 and/or different ones of the energy sources 162 to provide different amounts of heating energy to the workpiece 190.

The upper heating mechanism 120 includes multiple temperature sensors 132 and the lower heating mechanism 160 includes multiple temperature sensors 152. Each of the temperature sensors 132, 152 may be configured for non-contact temperature measurement so that temperatures of respective portions of the surfaces 191, 192 may be monitored. The temperature sensors 132, 152 may each be, for example, a pyrometer configured to evaluate electromagnetic radiation radiated from the surfaces 191, 192 to determine the temperature of the respective portion of the surfaces 191, 192. Each of the temperature sensors 132, 152 may be configured to measure the temperature of a respective portion (e.g., two-dimensional area) of a respective one of the surfaces 191, 192. For example, one or more of the temperature sensors 132 may measure the temperature of a transverse strip 133 (FIG. 1) of a respective workpiece. As another example, one or more of the temperature sensors 132 may measure the temperature of a circular or elliptical region 134 (FIG. 1), or a portion thereof, of a respective workpiece. The temperature sensors 132, 152 may be arranged in a regular pattern, e.g., disposed along a length of the sublimation device 100 at regular intervals (being evenly spaced with the same distance between each two adjacent temperature sensors), or disposed in a two-dimensional array with a regular pattern, or disposed in another arrangement. The temperature sensors 132, 152 may be arranged to help ensure that the entire top and bottom surfaces of any workpiece placed in the sublimation device 100 may be monitored (i.e., such that coverage areas of the temperature sensors 132, 152 in combination cover the entire top and bottom workpiece surfaces). Quantities and center-to-center spacings 446, 448 of the temperature sensors 132, 152 may be selected to help ensure that a desired resolution (e.g., a desired granularity of workpiece surface area) of temperatures may be sensed.

Figure 5:
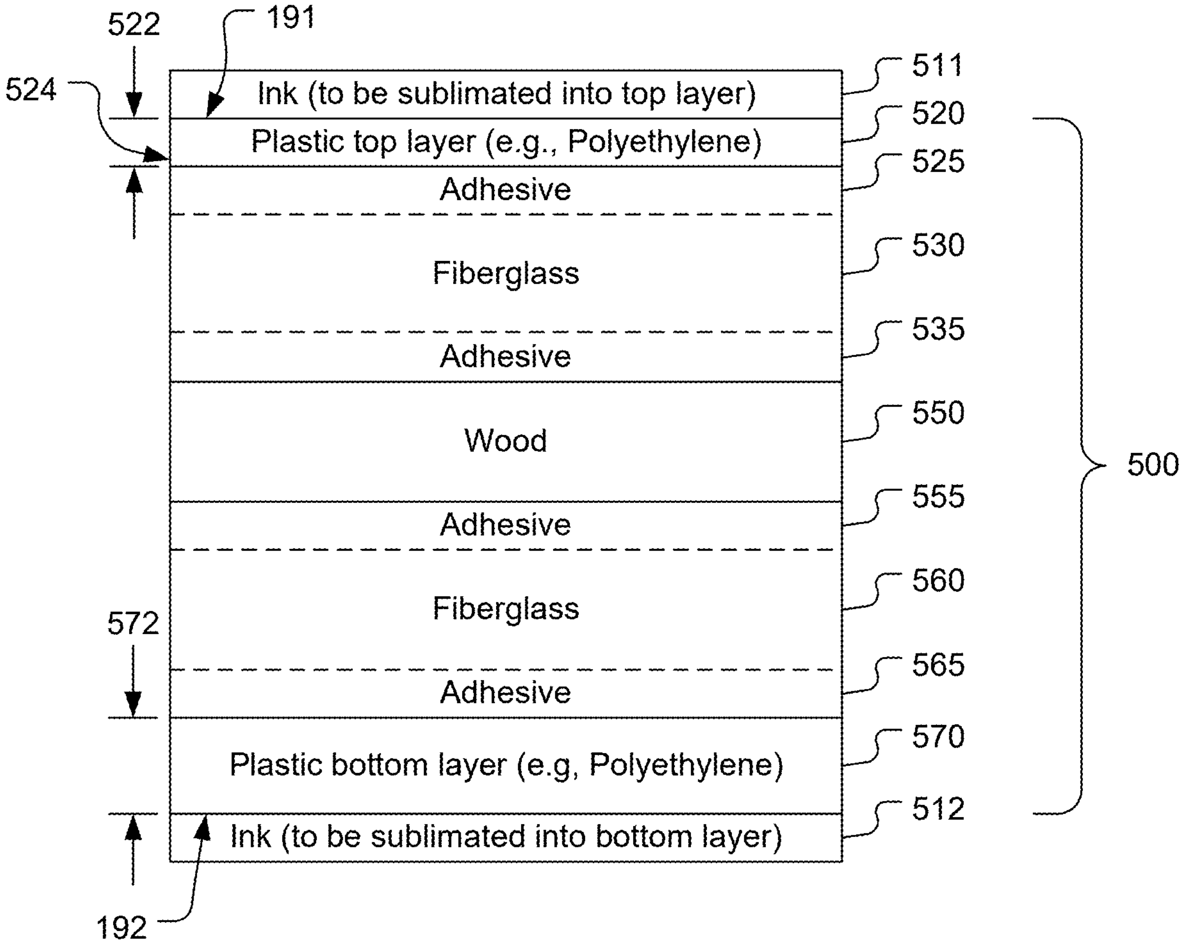
FIG. 5 is a block diagram of artwork layers and a multi-layered workpiece.

Referring also to FIG. 5, the artwork sheets 411, 412 include inks 511, 512, respectively, and a workpiece 500 (that is an example of the workpiece 190) includes multiple layers of materials, here a plastic top layer 520, an adhesive layer 525, a fiberglass layer 530, an adhesive layer 535, a wood layer 550, an adhesive layer 555, a fiberglass layer 560, an adhesive layer 565, and a plastic bottom layer 570. The inks 511, 512 are disposed in the respective artwork sheets 411, 412 and have respective sublimation temperatures. For example, the sublimation temperatures of the inks 511, 512 may both be about 305° F. (about 152° C.). The plastic top layer 520 may be, for example, a high-density polyethylene and may be white in color (e.g., ICP 8100 made by Isosport Verbundbauteile GmbH of Eisenstadt, Austria). Adhesive primer may be used, e.g., adjacent the fiberglass layers 530, 560, which may help prevent separation of layers with temperatures at or near the breakdown temperature of the adhesive. The plastic bottom layer 570 may be, for example, a high-density plastic, e.g., polyethylene (e.g., DuraSurt™ made by Crown Plastics of Harrison, Ohio). While referred to as layers, and shown as separate layers for illustrative purposes, the adhesive layers 525, 535, 555, 565 may be portions of the fiberglass layers 530, 560, respectively. The fiberglass may be prepreg fiberglass, being a composite material with fiberglass fabric pre-impregnated with a partially cured resin (e.g., epoxy) that is ready for layup and curing. The adhesive impregnation may not be uniform in depth across a length (into and out of the page of FIG. 5) or width (side-to-side in FIG. 5) of the fiberglass layer 530 and/or the fiberglass layer 560. The adhesive impregnation may extend through an entire thickness of the fiberglass layer 530 and/or the fiberglass layer 560, or less than an entire thickness. The adhesive layers 525, 535, 555, 565 may comprise, for example, high bio-content, general-purpose liquid epoxy resin (e.g., Super SAP® 305 System made by Entropy Resins, Inc.). As another example, CPD 2134A Resin and CPD 9286B hardener sold by Polytek™ Development Corp. of Easton, Pennsylvania may be used. The adhesive layers 525, 565 have breakdown temperatures at which the adhesives 525, 565 lose their adhesive ability. For example, the adhesive layers 525, 565 may each comprise an epoxy with a breakdown temperature being a glass transition temperature $T_g$, and with the glass transition temperature being about 180° F. (about 82° C.).

The energy sources 122, 162 may be configured and controlled to heat the surfaces 191, 192 rapidly (to "flash heat" the surfaces 191, 192) for penetration of the inks 511, 512 into the layers 520, 570. The energy sources 122, under control of the controller 180, may heat the surface 191 quickly such that temperatures in the top layer 520 reach the sublimation temperature of the ink 511 to about 90% of a thickness 522 of the top layer 520, without a temperature of the adhesive layer 525 reaching the breakdown temperature of the adhesive layer 525. That is, the energy sources 122 may heat the surface 191 so fast that a depth 524 (that is about 90% of the thickness 522 from the surface 191) reaches the sublimation temperature of the ink 511 without enough time for conduction to heat the adhesive 525 to the breakdown temperature (e.g., the glass transition temperature). Similarly, the energy sources 162, under the control of the controller 180, are configured to heat the surface 192 quickly such that temperatures in the bottom layer 570 reach the sublimation temperature of the ink 512 to about 90% of a thickness 572 of the bottom layer 570, without a temperature of the adhesive layer 565 reaching the breakdown temperature of the adhesive layer 565. The controller 180 is configured to monitor temperatures of the surfaces 191, 192 and control the energy sources 122, 162 to heat the workpiece 500 for desired penetration of the inks 511, 512 without breaking down the adhesive layers 525, 565, e.g., by turning one or more of the energy sources 122, 162 down or off such that neither the temperature of the adhesive 525 nor the temperature of the adhesive 565 reaches the respective breakdown temperature.

The energy sources 122 and/or the energy sources 162 may be controlled for longer heating (i.e., slower than flash heating) of the surface 191 and/or the surface 192, even if the energy sources 122 and/or the energy sources 162 are configured to be capable of flash heating the surface 191 and/or the surface 192. For example, the surfaces 191, 192 may be heated over a sufficient time (e.g., about 15 minutes) such that adhesive, e.g., of the adhesive layers 525, 535, reaches a factory breakdown temperature of the adhesive without reaching a breakdown temperature of the adhesive layers 525, 535. For example, the breakdown temperature of the adhesive layers 525, 535 may be modified to be higher than a factory breakdown temperature, i.e., the breakdown temperature of the adhesive at the conclusion of manufacturing of the adhesive but before modification to increase the breakdown temperature. For example, the adhesive may be slowly heated (e.g., rising about 5° F. per minute) in a post-cure process (i.e., after the workpiece is cured and before the workpiece is subject to sublimation) until close to (e.g., to within 30° of) the sublimation temperature ink, and then returned to room temperature very slowly (e.g., lowering about 2° F. per minute). Other rates of heating and/or cooling may be used, and may depend on the adhesive (e.g., the epoxy) used.

The controller 180 may be configured to control the energy sources 122, 162 based on information from the temperatures sensors 132, 152 to have the temperatures of the surfaces 191, 192 be substantially uniform, while being heated and while maintaining a temperature. The controller 180 can use temperature feedback from the sensors 132, 152 to determine the temperatures across each of the surfaces 191, 192. The controller 180 may be configured to adjust the energy provided by one or more of the energy sources 122, 162 in order to keep the temperatures of different portions of each of the surfaces 191, 192 within a threshold uniformity, e.g., within about 10% (e.g., a lowest temperature of the surface 191 being within 10% of the highest temperature of the surface 191, i.e., at least 90% of the highest temperature of the surface 191). Alternatively, the controller 180 may be configured to adjust the energy provided by one or more of the energy sources 122, 162 in order to keep the temperatures of different portions of each of the surfaces 191, 192 within a threshold percentage, e.g., within 5% (or within 3%, or within 2%), of a mean of the temperatures of the respective surface 191, 192. The controller 180 may be configured to detect a cold spot (e.g., a region of a respective one of the surfaces 191, 192 with a temperature significantly below the mean temperature for the respective surface 191, 192) by increasing the heating of the area of the cold spot. Similarly, controller 180 may be configured to detect a hot spot (e.g., a region of a respective one of the surfaces 191, 192 with a temperature significantly above the mean temperature for the respective surface 191, 192) by decreasing the heating of the area of the hot spot. The controller 180 may control (e.g., turn off or direct) one or more of the energy sources 122, 162 based on the size(s) and/or orientation(s) of the workpiece(s) in the sublimation device 100. For example, energy sources 122, 162 disposed outside a footprint of the workpiece(s) may be turned off or directed toward a workpiece.

The controller 180 may be configured to control the energy sources 122, 162 based on information from the temperature sensors 132, 152 to have the inks 511, 512 penetrate into the layers 520, 570 without breaking down the adhesive layers 525, 565. The controller 180 may be configured to monitor the temperatures of the surfaces 191, 192 to try to ensure that temperatures in the layers 520, 570 down to a respective desired depth (e.g., about 90% of the thicknesses 522, 572, respectively) reach the sublimation temperature of the inks 511, 512, without a respective temperature of the adhesive layers 525, 565 reaching the respective breakdown temperature. The controller 180 (e.g., the memory 430) may store information (e.g., surface temperatures and durations) from which a depth of penetration of the respective sublimation temperature may be determined for each of the layers 520, 570. The controller 180 may control the energy sources 122, 162 to heat the surfaces 191, 192 to obtain the desired penetration of the sublimation temperature, to maintain this temperature penetration for a desired amount of time, and to decrease the temperatures once the desired amount of time passes. For example, the controller 180 may cause the energy sources 122, 162 to decrease the amounts of heat induced in the workpiece 190, e.g., to allow the temperatures of the surfaces 191, 192 to decrease and be maintained substantially uniform while decreasing. As another example, once the desired time has passed, the controller 180 may cause the energy sources 122, 162 to turn off. The temperature of the surface 191 and/or the surface 192 may be decreased while under pressure, e.g., to help prevent separation of layers even if the adhesive has become ductile until the adhesive becomes rigid (again). For example, the temperature of the surface 191 and/or the surface 192 may be decreased while under pressure until the surface temperature(s) reach about 150° F.

By avoiding the adhesive layers 525, 565 reaching the respective breakdown temperature (which may be higher than a factory breakdown temperature), the workpiece may be infused with the inks 511, 512 after the workpiece 500 has been shaped into a non-flat configuration and without the adhesive integrity of the adhesive layers 525, 565 being compromised, such that the shape of the workpiece 500 may be maintained. Three-dimensional workpieces, e.g., with one or more curved surfaces, may be infused with ink using techniques discussed herein. Using techniques discussed herein, ink transfer into the workpiece 500 may be performed on an otherwise finished product. Consequently, for example, a pre-shaped workpiece may have custom-ordered (or even custom-made) artwork applied to the workpiece at or near the end of the manufacturing process such that a customer of a workpiece with custom-ordered artwork may receive the workpiece very soon after having the artwork applied, instead of having to wait for the workpiece to be shaped after having the artwork applied. Another possible consequence of transferring ink to the workpiece in this way is that specific workpiece-artwork combinations may be made only if purchased, thus avoiding workpiece overstock. Alternatively, specific workpiece-artwork combinations may be made before purchase where there is a high level of confidence in the future purchasing of these items (e.g., 100 of a specific workpiece-artwork combination), and workpiece-artwork combinations of lower purchase confidence (e.g., any of the specific workpiece-artwork combination beyond 100) being made in response to a purchase. This may reduce or even avoid overstock of workpiece-artwork combinations. Applying ink by sublimation to a workpiece at or near the end of the manufacturing process may be referred to as "last-step sublimation" (even if one or more process steps are performed after the sublimation ink transfer).

The controller 180 may be configured to control the energy sources 122, 162 to heat the surfaces 191, 192 to different temperatures, with different heating profiles, and/or for different amounts of time. A heating profile is a temperature as a function of time. The controller 180 may be configured to cause the energy sources 122 to provide different amounts of energy to the surface 191 than the energy sources 162 provide to the surface 192 such that the surface 191 heats with a different temperature-versus-time compared to the surface 192. The controller 180 may cause the energy sources 122, 162 to heat the surfaces 191, 192 to different temperatures, e.g., based on the inks 511, 512 having different sublimation temperatures. The controller 180 may cause the energy sources 122, 162 to heat the surfaces 191, 192 for different amounts of time, e.g., based on the thickness 522 of the top layer 520 being different from the thickness 572 of the bottom layer 570. For example, the thickness 522 may be about 0.6 mm and the thickness 572 of the bottom layer 570 may be about 1.3 mm (e.g., to accommodate tuning of the workpiece (e.g., removing some of the bottom layer 570) over time). Consequently, the controller 180 may cause the energy sources 122 to heat the surface 191 for less time than the controller 180 causes the energy sources 162 to heat the surface 192, e.g., to achieve the same percentage penetration of the inks 511, 512, respectively. The different amounts of time of heating of the top layer 520 and the bottom layer 570 may not be directly proportional to the thicknesses 522, 572, e.g., due to non-linear rate of penetration of the inks 511, 512, and/or due to one or more different material characteristics of the layers 520, 570. For example, the bottom layer 570, with the workpiece 500 being a snowboard, ski, wakeboard, skimboard, etc. may be much more porous (may have a larger pore size) than the top layer 520 in order for the bottom layer 570 to accept wax to facilitate the workpiece sliding over a respective substance (e.g., snow, liquid water, etc.).

Figure 6:
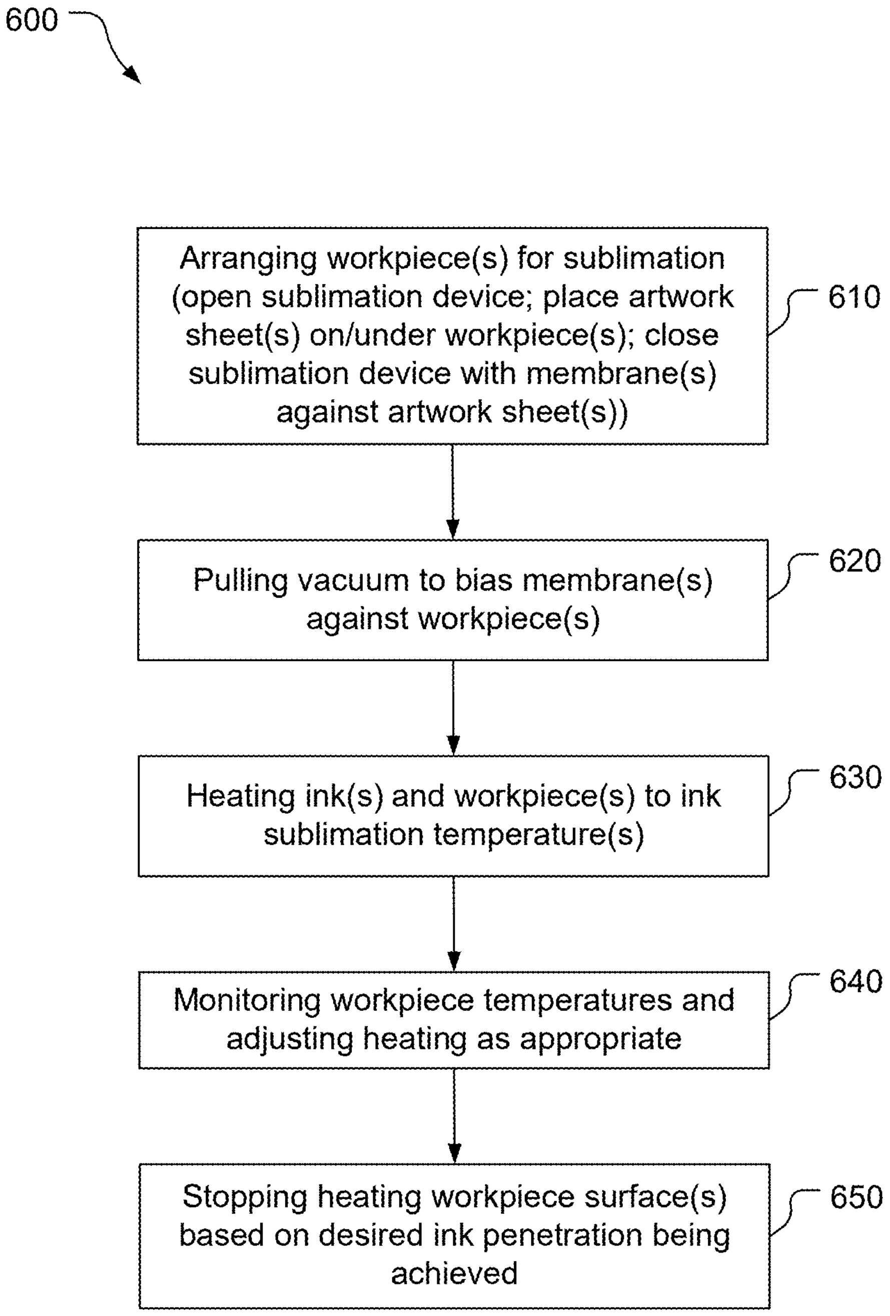
FIG. 6 is a block flow diagram of an example sublimation method.

Referring to FIG. 6, with further reference to FIGS. 1-5 and 7-12, a sublimation method 600 includes the stages shown. The method 600 is, however, an example only and not limiting. The method 600 may be altered, e.g., by having one or more stages added, removed, rearranged, combined, performed concurrently, and/or by having one or more single stages split into multiple stages. The description below discusses multiple workpieces being subject to ink penetration by sublimation, but the method 600 is applicable to use with a single workpiece (as suggested by the text in FIG. 6).

Figure 7:
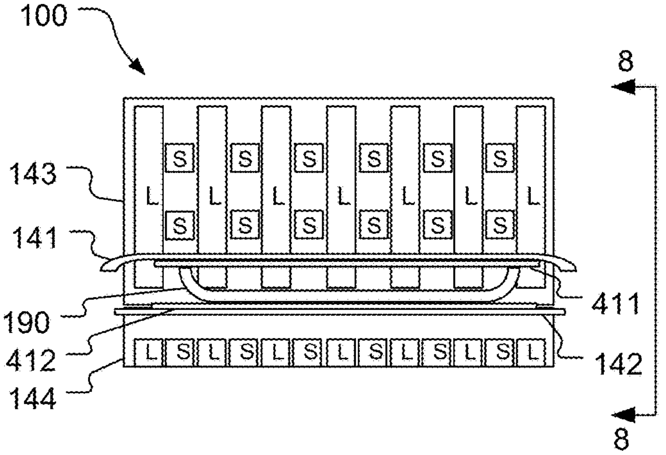
FIG. 7 is a front view of portions of the sublimation device shown in FIG. 1 with the sublimation device in an open state, showing energy sources, sensing elements, one of two received workpieces, artwork sheets, and membranes.
Figure 8:
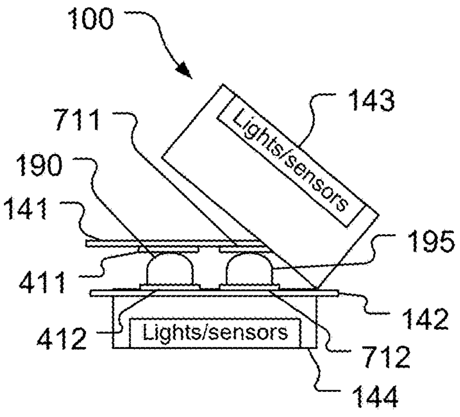
FIG. 8 is a side view of the portions of the sublimation device shown in FIG. 7, as viewed from line 8-8 in FIG. 7.
Figure 9:
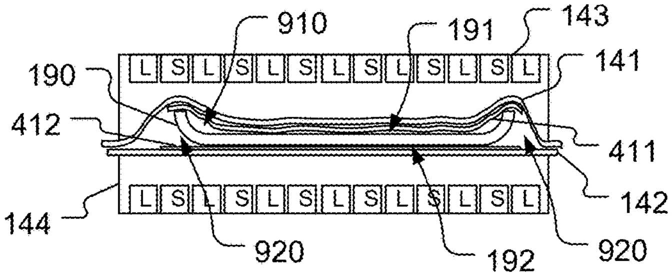
FIG. 9 is a cutaway front view of portions of the sublimation device shown in FIG. 1 with the sublimation device in a closed state.

At stage 610, the method 600 includes arranging one or more workpieces for sublimation, i.e., receiving sublimated ink particles into a porous layer of the workpiece(s). For example, as shown in FIG. 7 and FIG. 8, the workpiece 190 is placed on the artwork sheet 412 and the workpiece 195 is placed on an artwork sheet 712. The artwork sheets 412, 712 contain ink in desired patterns to be transferred by sublimation into a respective bottom layer of each the workpieces 190, 195. The artwork sheets 412, 712 are disposed on the membrane 142. Further, the artwork sheet 411 and an artwork sheet 711 are disposed on top of the workpieces 190, 195, respectively, and the membrane 141 disposed on top of the artwork sheets 411, 711. The sublimation device 100 may be closed by pivoting the upper container member 143 relative to the lower container member 144 about the hinge 145 (see FIG. 1). In the closed position, as shown in FIG. 9, the membranes 141, 142 are disposed against the artwork sheets 411, 412, and extend outside of perimeters of the container members 143, 144, although the membranes 141, 142 may not extend beyond the perimeters of the container members 143, 144.

The sublimation device 100 as shown in FIG. 1 and FIG. 8 has a clamshell configuration, but other configurations may be used. For example, a sublimation device may have sections that slide (e.g., vertically) toward or away from each other (instead of pivoting toward or away from each other). As another example, a sublimation device may have sections that slide laterally relative to each other between an operational position with the sections overlapping each other and a loading/unloading position with the section overlapping less than while in the operational position (and possibly not overlapping at all). As another example, a sublimation device may have an oven configuration with an opening in one side to allow a workpiece to be slid into the sublimation device. Still other configurations may be used.

Figure 10:
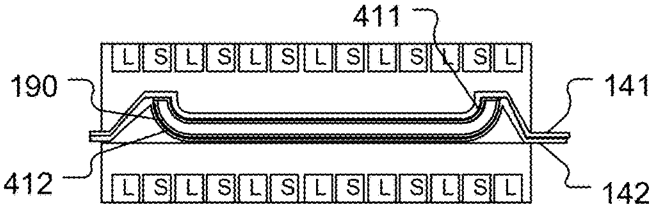
FIG. 10 is a cutaway front view of the portions of the sublimation device shown in FIG. 9 with a vacuum having been drawn to bias artwork sheets against workpieces.

At stage 620, with particular reference to FIG. 10, the method 600 includes pulling (producing) a vacuum between the workpieces 190, 195 and the membranes 141, 142, e.g., between the membranes 141, 142. This causes the membranes 141, 142 to be biased against the artwork sheets 411, 412, 711, 712 and to bias the artwork sheets 411, 412, 711, 712 against the workpieces 190, 195 (against respective top and bottom surfaces of the workpieces 190, 195). The membranes 141, 142 are pliable and adapt to the three-dimensional surface contours of the workpieces 190, 195 to press the artwork sheets 411, 412, 711, 712 against the respective workpiece surfaces even though the surfaces are not flat (non-planar), e.g., are bent along lengths and/or widths of the workpieces 190, 195.

Figure 11:
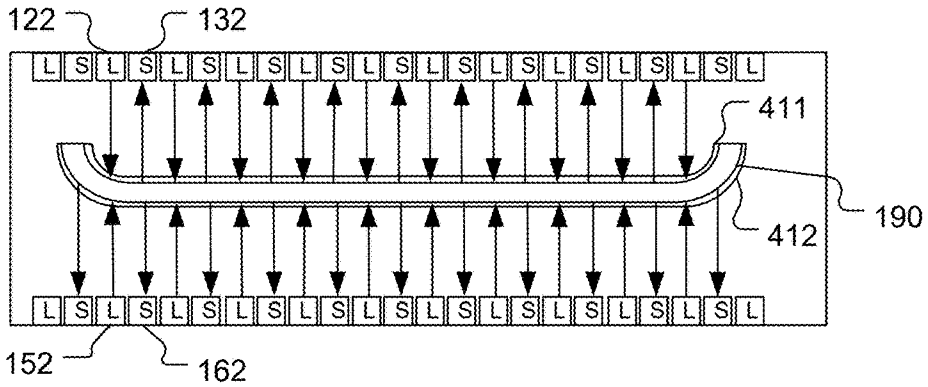
FIG. 11 is a cutaway front view of the portions of the sublimation device shown in FIG. 9 with energy sources providing light and sensing elements sensing temperatures.
Figure 12A:
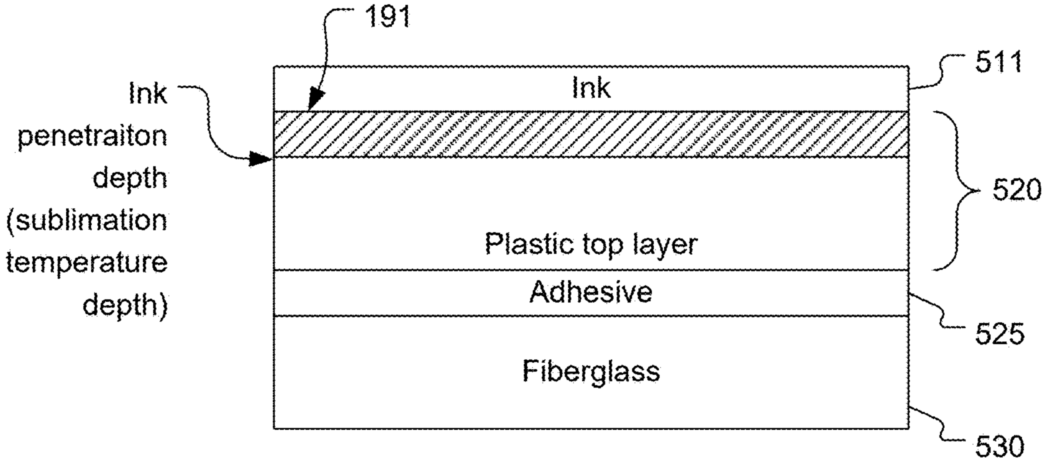
FIG. 12A is a side view of a portion of the workpiece shown in FIG. 5 with partial ink penetration into a top layer of the workpiece.

At stage 630, the method 600 includes heating inks and workpieces to the sublimation temperature(s) of the inks. For example, as shown in FIG. 11, the energy sources 122, 162 transmit light to artwork sheets 411, 412 and to the surfaces 191, 192 of the workpiece 190. Although the workpiece 195 is not shown in FIG. 11, the energy sources 122, 162 also transmit light to top and bottom surfaces of the workpiece 195 and to the artwork sheets 711, 712. The light provided by the energy sources 122, 162 heats the ink 511, 512 (FIG. 5), the inks in the artwork sheets 711, 712, and the workpieces 190, 195 to the respective sublimation temperature (which may be the same temperature for both of the inks 511, 512). The sublimated ink may then begin to penetrate the surfaces of the workpieces 190, 195. For example, as shown in FIG. 12A, the ink 511 has penetrated the top layer 520 to an ink penetration depth that coincides with a sublimation temperature depth, i.e., the furthest distance from the surface 191 that is at or above the sublimation temperature (although the ink penetration depth and the sublimation temperature depth may not be equal).

At stage 640, the method 600 includes monitoring workpiece temperatures and adjusting heating as appropriate. For example, the sensors 132, 152 sense temperatures of respective portions (e.g., areas) of the surfaces of the workpieces 190, 195. The controller 180 may increase or decrease the light provided to a respective area of a workpiece based on the area having a higher or lower temperature than desired. For example, more light may be provided to an area of the surface 191 that is below a mean temperature of the surface 191 by more than a threshold (e.g., 5% of the mean temperature). As another example, less light may be provided to an area of the surface 191 that is above a mean temperature of the surface 191 by more than a threshold (e.g., 5% of the mean temperature).

Figure 12B:
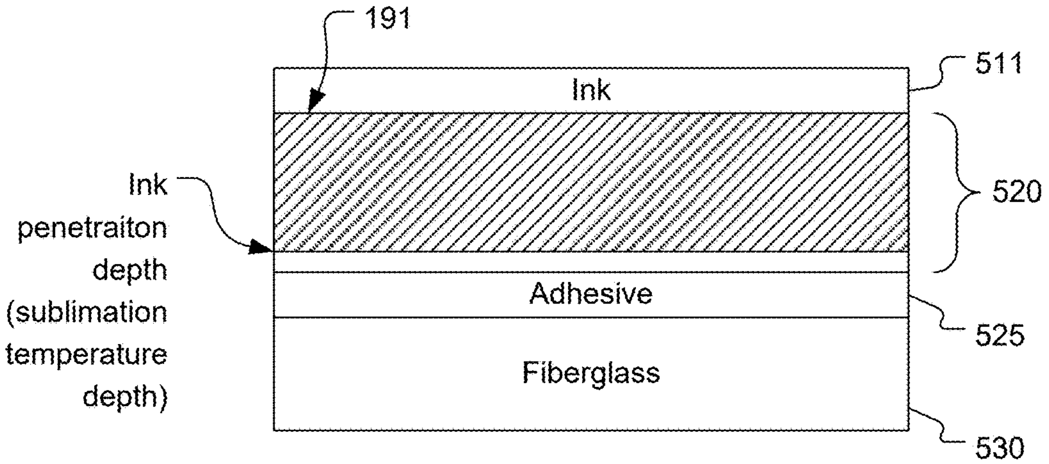
FIG. 12B is a side view of a portion of the workpiece shown in FIG. 5 with full desired ink penetration into the top layer of the workpiece.

At stage 650, the method includes stopping heating the workpiece surface(s) based on a desired ink penetration being achieved while avoiding heating adhesive(s) to the breakdown temperature(s) (which may be higher than factory breakdown temperature(s)). For example, the controller 180 may determine, e.g., based on stored values corresponding to experimental data regarding workpiece surface temperature, workpiece material, time, and sublimation temperature penetration depth, when a desired depth (e.g., 90% of the thickness 522 of the top layer 520 or 90% of the thickness 572 of the bottom layer 570) is likely to have reached the sublimation temperature, and turn the corresponding energy sources 122, 162 down or even off. For example, as shown in FIG. 12B, the ink 511 has penetrated about 90% through the top layer 520. The controller 180 may control the energy sources 122, 162 to turn off once the desired depth is expected to have reached the sublimation temperature and before any adjacent adhesive, e.g., the adhesive layer 525 or the adhesive layer 565 has reached a respective breakdown temperature (e.g., glass transition temperature). This may help avoid layers of the workpiece, e.g., the layers 520, 530 and/or the layers 560, 570 from moving relative to each other and/or may help avoid layers of the workpiece from relaxing and losing a non-planar shaped previously imparted to the layers (e.g., changing from a non-planar shape toward an original, planar shape). The controller 180 may control the energy sources 122 to heat the top surface 191 to a different temperature and/or for a different amount of time than the control causes the energy sources 162 to heat the bottom surface 192 to achieve the desired ink penetration of the top layer 520 and the desired ink penetration of the bottom layer 570. The desired ink penetrations of the layers 520, 570 may be different (e.g., different distances and/or different percentages of respective thicknesses).

Figure 13:
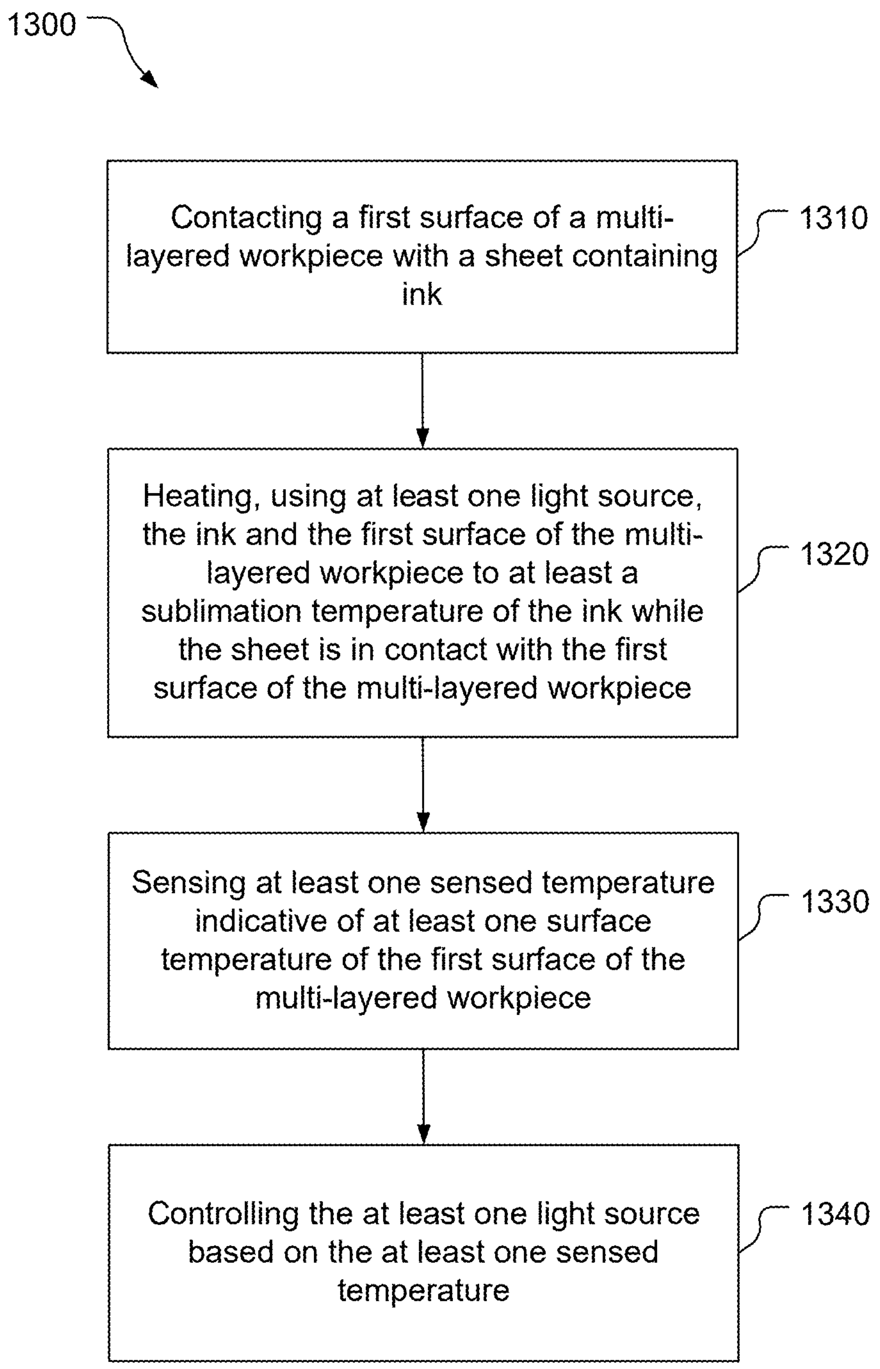
FIG. 13 is a block flow diagram of another example sublimation method.

Referring to FIG. 13, with further reference to FIGS. 1-12, a sublimation method 1300 includes the stages shown. The method 1300 is, however, an example only and not limiting. The method 1300 may be altered, e.g., by having one or more stages added, removed, rearranged, combined, performed concurrently, and/or by having one or more single stages split into multiple stages.

At stage 1310, the method 1300 includes contacting a first surface of the multi-layered workpiece with a sheet containing the ink. For example, as shown in FIG. 7 and FIG. 8, the surface 191 of the workpiece 190 may be contacted with the artwork sheet 411, the surface 192 of the workpiece 190 may be contacted with the artwork sheet 412, a top surface of the workpiece 195 may be contacted with the artwork sheet 711, and/or a bottom surface of the workpiece 195 may be contacted with the artwork sheet 712. The membrane 141 and/or the membrane 142 may comprise means for contacting a first surface of a multi-layered workpiece with a sheet containing ink. The workpiece may have a three-dimensional shape (e.g., a contoured, not-flat (in addition to have non-zero thickness) shape such that a height of the workpiece is greater than a thickness of the workpiece, e.g., a workpiece that is bent along a length and/or a width of the workpiece).

At stage 1320, the method 1300 includes heating, using at least one energy source, the ink and the first surface of the multi-layered workpiece to at least a sublimation temperature of the ink while the sheet is in contact with the first surface of the multi-layered workpiece. For example, at stage 630 and as shown in FIG. 11, the energy sources 122 and/or the energy sources 162 (e.g., light sources) provide light to heat ink of the artwork sheet 411, the artwork sheet 412, the artwork sheet 711, and/or the artwork sheet 712, and provide light to heat the surface 191 and/or the surface 192 of the workpiece 190 and/or the top surface and/or the bottom surface of the workpiece 195. The ink(s) and the workpiece surface(s) are heated to the sublimation temperature. The energy sources 122 and/or the energy sources 162 may comprise means for heating the ink and the first surface of the workpiece.

At stage 1330, the method 1300 includes sensing at least one sensed temperature indicative of at least one surface temperature of the first surface of the multi-layered workpiece. For example, at stage 640 and as shown in FIG. 11, each of the sensors 132 and/or each of the sensors 152 monitors the temperature of a respective workpiece surface portion. The sensors 132 and/or the sensors 152 may comprise means for sensing at least one temperature indicative of at least one surface temperature of the first surface of the workpiece.

At stage 1340, the method 1300 includes controlling the at least one energy source based on the at least one sensed temperature. For example, at stage 640 the controller 180 controls one or more of the energy sources 122 and/or one or more of the energy sources 162 based on the sensed temperature(s), e.g., to provide more or less energy to increase or decrease ink and workpiece temperature. The processor 410, possibly in combination with the memory 430, may comprise means for controlling the at least one energy source.

Implementations of the method 1300 may include one or more of the following features. In an example implementation, the multi-layered workpiece includes a first layer that provides the first surface of the multi-layered workpiece, a second layer, and an adhesive between the first layer and the second layer, and wherein the at least one energy source is controlled to maintain a temperature of the adhesive below a breakdown temperature of the adhesive at which the adhesive changes from being rigid to being ductile. For example, the workpiece 500 includes the top layer 520, the fiberglass layer 530, and the adhesive layer 525 therebetween. As another example, the workpiece 500 includes the bottom layer 570, the fiberglass layer 560, and the adhesive layer 565 therebetween. The controller 180 may control the energy sources 122 and/or the energy sources 162 to inhibit the adhesive layer 525 and/or the adhesive layer 565 from reaching a respective breakdown temperature. In a further example implementation, the breakdown temperature is a modified breakdown temperature that is higher than a factory breakdown temperature of the adhesive that the adhesive has when provided by a manufacturer of the adhesive. In another further example implementation, heating the ink and the first surface comprises flash heating the ink and the first surface. For example, flash heating may be used to help keep the adhesive temperature below the breakdown temperature. In other examples, slower (non-flash) heating may be used, e.g., with the breakdown temperature of the adhesive having been modified to be higher than the factory breakdown temperature of the adhesive. In another further example implementation, the adhesive is an epoxy and the breakdown temperature is a glass transition temperature. For example, the adhesive layer 525 and/or the adhesive layer 565 may comprise epoxy and the controller 180 may control the energy sources 122 and/or the energy sources 162 to inhibit the adhesive layer 525 and/or the adhesive layer 565 from reaching a respective glass transition temperature.

Also or alternatively, implementations of the method 1300 may include one or more of the following features. In an example implementation, the sheet is a first sheet; the ink is first ink; the at least one energy source is at least one first energy source; the at least one sensed temperature is at least one first sensed temperature; the at least one surface temperature is at least one first surface temperature; the sublimation temperature is a first sublimation temperature; and the method further comprises: contacting a second surface of the multi-layered workpiece with a second sheet containing second ink; heating, using at least one second energy source, the second ink and the second surface of the multi-layered workpiece to at least a second sublimation temperature of the second ink while the second sheet is in contact with the second surface of the multi-layered workpiece; sensing at least one second sensed temperature indicative of at least one surface temperature of the second surface of the multi-layered workpiece; and controlling the at least one second energy source based on the at least one second sensed temperature. For example, multiple sides of one or more workpieces may be concurrently infused with ink by sublimation by the sublimation device 100, with stages 1310, 1320, 1330, 1340 applied to each of multiple sides of the one or more workpieces. As another example, multiple sides of one or more workpieces may be sequentially infused with ink by sublimation by the sublimation device 100, with stages 1310, 1320, 1330, 1340 applied to one side of the workpiece(s), the workpiece(s) flipped, and stages 1310, 1320, 1330, 1340 applied to the other side of the workpiece(s). In a further example implementation, the at least one first energy source is controlled to heat the first ink and the first surface of the multi-layered workpiece to at least the first sublimation temperature of the first ink for a first time duration and the at least one second energy source is controlled to heat the second ink and the second surface of the multi-layered workpiece to at least the second sublimation temperature of the second ink for a second time duration, and wherein at least one of (1) the first sublimation temperature is different from the second sublimation temperature, and (2) the first time duration is different from the second time duration. For example, as discussed above, the controller 180 may control the energy sources 122 and the energy sources 162 to heat respective workpiece surfaces, e.g., the surfaces 191, 192 of the workpiece 190, to respective sublimation temperatures for respective amounts of time where the sublimation temperatures and/or the amounts of time may be different. In another further example implementation, contacting the first surface of the multi-layered workpiece with the first sheet comprises withdrawing air from a first volume between the first surface of the multi-layered workpiece and a first membrane with the first sheet disposed between the first surface of the multi-layered workpiece and the first membrane, and wherein contacting the second surface of the multi-layered workpiece with the second sheet comprises withdrawing air from a second volume between the second surface of the multi-layered workpiece and a second membrane with the second sheet disposed between the second surface of the multi-layered workpiece and the second membrane. For example, at stage 620 and as shown in at least FIG. 9 and FIG. 10, the vacuum 170 may pull a vacuum by withdrawing air from a volume 910 between the membrane 141 and the top surface 191 of the workpiece 190 and withdrawing air from a volume 920 between the membrane 142 and the bottom surface 192 of the workpiece 190. The vacuum 170 may comprise means for withdrawing the air.

Also or alternatively, implementations of the method 1300 may include one or more of the following features. In an example implementation, the at least one energy source is controlled to heat the first surface of the multi-layered workpiece to maintain a temperature variation across the first surface of the multi-layered workpiece of less than 10%. For example, the controller 180 may use temperature feedback from the sensors 132 and/or the sensors 152 to adjust the energy sources 122 and/or the energy sources 162, respectively, to maintain temperatures across the surface 191 and/or the surface 192 to be within 10% of each other. In a further example implementation, the at least one sensed temperature comprises at least two sensed temperatures indicative of at least two surface temperatures of the first surface of the multi-layered workpiece, and wherein the at least one energy source is controlled to adjust amounts of energy (e.g., light) provided to different parts of the first surface of the multi-layered workpiece based on the at least two sensed temperatures to maintain the temperature variation across the first surface of the multi-layered workpiece of less than 10%. For example, the controller 180 may use temperature feedback from the sensors 132 and the sensors 152 to adjust the energy sources 122 and the energy sources 162, respectively, to maintain temperatures across the surface 191 to be within 10% of each other and to maintain temperatures across the surface 192 to be within 10% of each other.

What is claimed is:

1. A method, for transferring ink from a sheet to a multi-layered workpiece, comprising:

contacting a first surface of the multi-layered workpiece with the sheet containing ink;

heating, using at least one energy source, the ink and the first surface of the multi-layered workpiece to at least a sublimation temperature of the ink while the sheet is in contact with the first surface of the multi-layered workpiece;

sensing at least one sensed temperature indicative of at least one surface temperature of at least one region of the first surface of the multi-layered workpiece overlapping with at least one portion of the ink to be transferred; and controlling the at least one energy source based on the at least one sensed temperature;

wherein the multi-layered workpiece includes a first layer that provides the first surface of the multi-layered workpiece, a second layer, and an adhesive between the first layer and the second layer, and wherein the at least one energy source is controlled to maintain a temperature of the adhesive below a breakdown temperature of the adhesive at which the adhesive changes from being rigid to being ductile.

2. The method of claim 1, wherein the breakdown temperature is a modified breakdown temperature that is higher than a factory breakdown temperature of the adhesive that the adhesive has when provided by a manufacturer of the adhesive.

3. The method of claim 1, wherein heating the ink and the first surface comprises flash heating the ink and the first surface.

4. The method of claim 1, wherein the adhesive is an epoxy and the breakdown temperature is a glass transition temperature.

5. The method of claim 1, wherein the at least one energy source is controlled to heat the first surface of the multi-layered workpiece to maintain a temperature variation across the first surface of the multi-layered workpiece of less than 10%.

6. The method of claim 5, wherein the at least one sensed temperature comprises at least two sensed temperatures indicative of at least two surface temperatures of the first surface of the multi-layered workpiece, and wherein the at least one energy source is controlled to adjust amounts of energy provided to different parts of the first surface of the multi-layered workpiece based on the at least two sensed temperatures to maintain the temperature variation across the first surface of the multi-layered workpiece of less than 10%.

7. The method of claim 1, wherein sensing the at least one sensed temperature comprises sensing a plurality of sensed temperatures of a plurality of areas of the first surface.

8. The method of claim 7, wherein controlling the at least one energy source comprises controlling a plurality of energy sources based on the plurality of sensed temperatures to provide different amounts of heating energy from different ones of the plurality of energy sources.

9. A method, for transferring ink from a sheet to a multi-layered workpiece, comprising:

contacting a first surface of the multi-layered workpiece with the sheet containing ink;

heating, using at least one energy source, the ink and the first surface of the multi-layered workpiece to at least a sublimation temperature of the ink while the sheet is in contact with the first surface of the multi-layered workpiece;

sensing at least one sensed temperature indicative of at least one surface temperature of the first surface of the multi-layered workpiece; and controlling the at least one energy source based on the at least one sensed temperature;

wherein: the sheet is a first sheet; the ink is first ink; the at least one energy source is at least one first energy source; the at least one sensed temperature is at least one first sensed temperature; the at least one surface temperature is at least one first surface temperature; the sublimation temperature is a first sublimation temperature; and the method further comprises:

contacting a second surface of the multi-layered workpiece with a second sheet containing second ink;

heating, using at least one second energy source, the second ink and the second surface of the multi-layered workpiece to at least a second sublimation temperature of the second ink while the second sheet is in contact with the second surface of the multi-layered workpiece;

sensing at least one second sensed temperature indicative of at least one surface temperature of the second surface of the multi-layered workpiece; and controlling the at least one second energy source based on the at least one second sensed temperature.

10. The method of claim 9, wherein the at least one first energy source is controlled to heat the first ink and the first surface of the multi-layered workpiece to at least the first sublimation temperature of the first ink for a first time duration and the at least one second energy source is controlled to heat the second ink and the second surface of the multi-layered workpiece to at least the second sublimation temperature of the second ink for a second time duration, and wherein at least one of (1) the first sublimation temperature is different from the second sublimation temperature, and (2) the first time duration is different from the second time duration.

11. The method of claim 9, wherein contacting the first surface of the multi-layered workpiece with the first sheet comprises withdrawing air from a first volume between the first surface of the multi-layered workpiece and a first membrane with the first sheet disposed between the first surface of the multi-layered workpiece and the first membrane, and wherein contacting the second surface of the multi-layered workpiece with the second sheet comprises withdrawing air from a second volume between the second surface of the multi-layered workpiece and a second membrane with the second sheet disposed between the second surface of the multi-layered workpiece and the second membrane.

12. The method of claim 9, wherein the first surface of the multi-layered workpiece is one of a top surface of the multi-layered workpiece and a bottom surface of the multi-layered workpiece, and wherein the workpiece is selected from the group consisting of a snowboard, a ski, a wakeboard, a wakesurfer, a surfboard, and a skimboard.

13. A method, for transferring ink from a sheet to a multi-layered workpiece, comprising:

contacting a first surface of the multi-layered workpiece with the sheet containing ink;

heating, using at least one energy source, the ink and the first surface of the multi-layered workpiece to at least a sublimation temperature of the ink while the sheet is in contact with the first surface of the multi-layered workpiece;

sensing at least one sensed temperature indicative of at least one surface temperature of the first surface of the multi-layered workpiece; and controlling the at least one energy source based on the at least one sensed temperature to maintain a temperature of an adhesive, between a first layer of the multi-layered workpiece and a second layer of the multi-layered workpiece, below a breakdown temperature of the adhesive at which the adhesive changes from being rigid to being ductile.

* * * * *